June 23, 1936.  G. H. ROESCH  2,045,412
CHANGE SPEED MECHANISM FOR VARIABLE SPEED GEARS
Filed Dec. 6, 1934  4 Sheets-Sheet 4
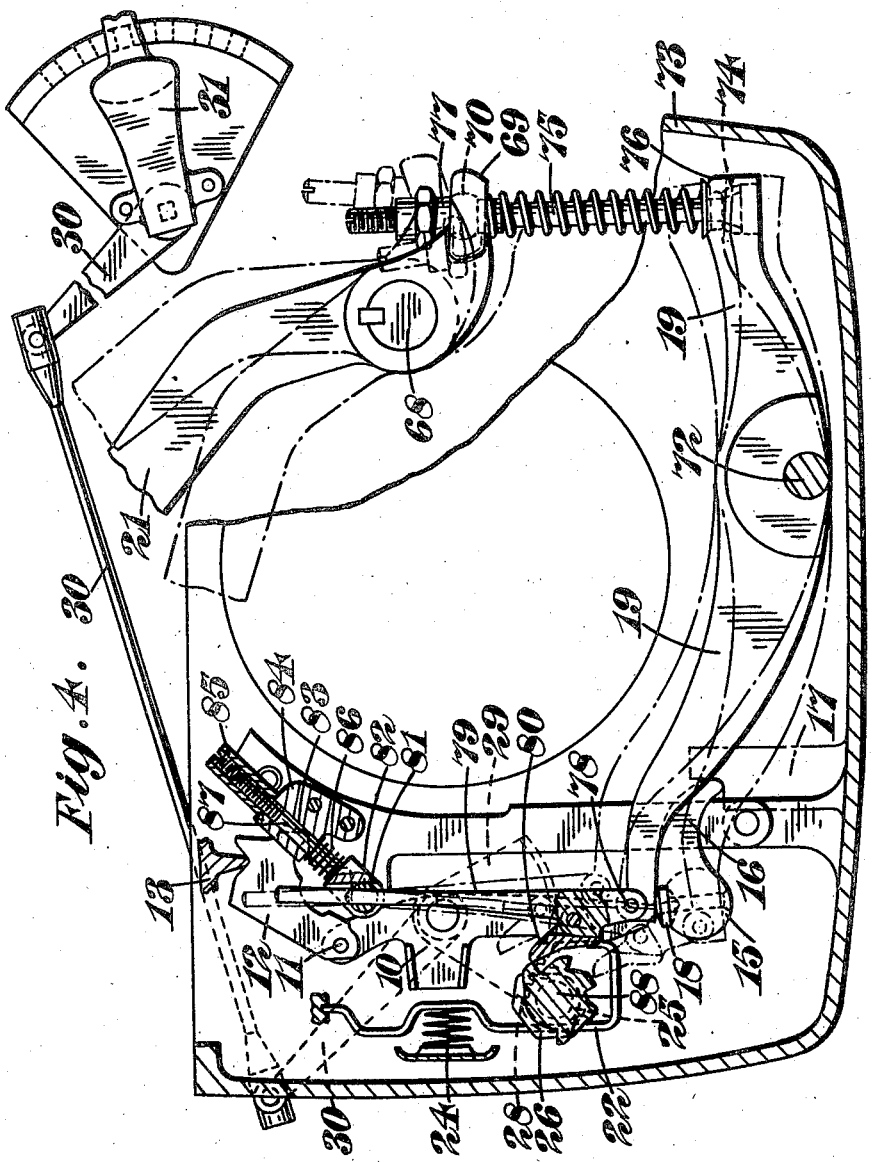

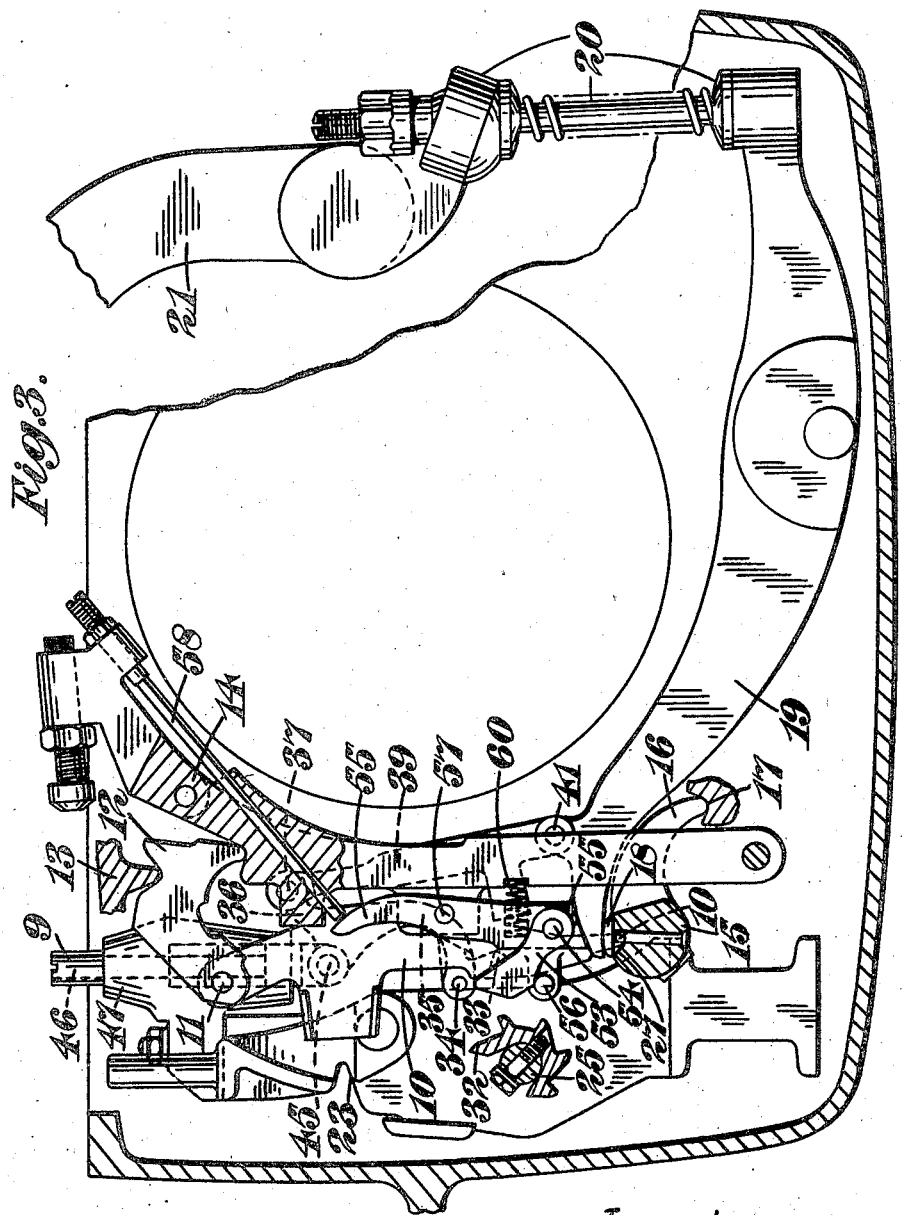

Patented June 23, 1936

2,045,412

UNITED STATES PATENT OFFICE 2,045,412

CHANGE SPEED MECHANISM FOR VARIABLE SPEED GEARS

Georges Henry Roesch, London, England, assignor of one-half to Clement Talbot Limited, London, England, a British company Application December 6, 1934, Serial No. 756,353
In Great Britain December 8, 1933

9 Claims. (Cl. 74—262)

This invention is for improvements in or relating to change speed mechanism for variable speed gears of the kind embodying a number of gear trains of different speed ratio and selector mechanism which is adapted to render operable one at a time a number of gear engaging means for said gear trains through the agency of an actuating member (e. g. a foot pedal) movable at the will of the operator. For example, the selector mechanism may be moved to a position indicating second gear while the first gear is in engagement and upon movement of the actuating member the first gear will be disengaged and the second gear engaged; whereas, if the selector mechanism is moved to a position indicating first gear, while the gears are in neutral position, upon operation of the actuating member the first gear will be engaged; while again, should the selector mechanism be moved to neutral when either the reverse gear or first gear are in operation, upon movement of the actuating member one of these gears will be engaged. In the arrangement referred to above, two distinct operations are carried out on the part of the operator for any change of gear; first, the selector mechanism requires to be set and secondly the actuating member requires to be moved.

According to this invention, a change speed mechanism for a variable speed gear comprises a movable actuating member, a plurality of gear engaging and disengaging means, a corresponding number of releasable mechanical connections between said means and the actuating member, a selector mechanism adjustable into one of a number of positions and adapted according to its adjustment to close any one of said connections and release the other connections and means for automatically altering said adjustment of the selector mechanism during the latter part of the movement of the actuating member. The automatic operation of the selector mechanism may be effected by interconnecting with it said actuating member, e. g. through a ratchet mechanism, so that during the first part of the movement of the actuating member the selector mechanism releases one of said connections but not until its gear train has been disengaged and closes another connection during the remaining part of said movement, while towards the latter part of the movement adjustment of the selector mechanism is altered.

Preferably, the actuating member is arranged to have a reciprocatory movement so that movement in one direction effects the disengagement of the gear train should such be in operation and movement in the other direction first engages another gear train which has been rendered operable by a previous movement of the actuating member and continued movement of the actuating member automatically adjusts the selector mechanism to render operable the engaging means of a gear train to be engaged when next the actuating member is moved.

Applying the invention to change speed mechanism for variable speed gears for automobiles, a feature of the invention consists in that a succession of movements of the actuating member bring various gear trains successively into operation in an ascending or descending order of gear ratio; for example, the mechanism may be so arranged that, starting from reverse, each successive operation of the actuating member brings the gear box into neutral position, then engages first gear, then engages second gear and so on until the gear box is brought into a top gear condition.

A still further feature of the invention consists in that in addition to said movable actuating member, there is provided an operating member under the direct control of the driver and connected to the selector mechanism, whereby adjustment of that mechanism may be effected independently of the actuating member. Preferably, the actuating member is so arranged that when it is in its initial position prior to a gear train being disengaged, it is free of engagement with said means. It will be appreciated with this arrangement that the additional control member can therefore be operated without its operation effecting movement of the actuating member.

In an arrangement in which the actuating member is arranged to have reciprocatory movement, a constructional feature of the invention consists in the provision of ratchet means between the actuating member and the selector mechanism. For example, in an arrangement in which the selector mechanism comprises a rotatable shaft, e. g. a cam shaft, the said shaft may have secured thereto a ratchet wheel and the actuating member, which may comprise a rocking lever, may have fixed thereto a pivoted pawl member which is arranged to engage the teeth of the ratchet during one direction of the rocking movement and to slide over the teeth during the other rocking movement.

A further feature of the invention consists in that said rocking lever is either connected to means (e. g. a bus bar) for controlling the engagement or disengagement of all the gear trains, or is operated by the same member which operates said means (e. g. by a foot pedal).

With such an arrangement described above, during one of the rocking movements of the lever a gear train will be disengaged and during the first part of the other rocking movement the previously selected gear train may be engaged, while during the next part of the movement the ratchet will be operated to render another gear engaging means operable ready for the next time the actuating member is moved. It is therefore important that the extent of movement of the rocking lever before the pawl engages a ratchet wheel may be accurately adjusted.

To enable the above mentioned adjustment to be effected, the pawl member is pivotally mounted upon a rod which is pivotally attached at one end to the rocking lever and is carried near the other end in a bearing member which is adjustable in relation to the rocking lever and therefore may control the time at which the pawl engages the teeth.

In the arrangement described above, the adjustment of the selector mechanism is automatically effected by connecting it to the actuating member. According to a further feature of the invention, means may be provided for interconnecting the gear engaging and disengaging means with the selector mechanism, so that the adjustment of the selector mechanism is automatically altered when the gear engaging means is operated.

A still further feature of the invention consists in that the selector mechanism may be interconnected both with the actuating member and with the gear engaging and disengaging means of the last of the succession of gear trains, so that a succession of movements of the actuating member effects a succession of adjustments of the selector mechanism, whereby the gear trains are brought into operation in one sequence of varying ratios until the movement of the last gear engaging and disengaging means adjusts the selector mechanism in the opposite direction. It will be appreciated with this arrangement that a succession of movements of the actuating member by the operator will cause successive engagement of the gear trains ranging from the bottom gear to the top gear, and after the top gear has been engaged, successive movements of the actuating member will effect engagement backwards and forwards between top gear and the next adjacent gear. In order that the lower gears may be engaged, preselector mechanism will require to be operated by hand, for example by an additional operating member under direct control of the driver and connected to said selector mechanism so that it may be adjusted independently of the actuating member.

Preferably, both the actuating member and the gear engaging means are arranged to have a reciprocatory movement and a feature of the invention as applied to such an arrangement consists in that a one-way drive device is arranged between the actuating member and the selector mechanism, and between the gear engaging and disengaging means of the last gear train and the preselector mechanism, which one-way drive devices comprise ratchet mechanism.

A still further feature of the invention consists in that said selector mechanism comprises a rotatable shaft having mounted thereon a mutilated ratchet wheel and in that two pawls, one mounted on the actuating member and the other on the gear engaging and disengaging means, are arranged to rotate said ratchet wheel in opposite directions, the arrangement of which parts is such that the pawl which is under direct control of said actuating member is located in the mutilated part of the ratchet wheel after the last gear train has been rendered operable, whereby the pawl on the gear engaging means of the last gear train is free to rotate the ratchet wheel in a direction to adjust the selector mechanism, whereby an adjacent gear train will be brought into operation when next the actuating member is moved.

The following is a description of two embodiments of the invention as applied to a gear box for a motor vehicle having a number of epicyclic gear trains controlled by selector mechanism, reference being made to the accompanying drawings in which—

Figure 3 is a cross-section through the gear box showing both the mechanisms of Figure 1 and Figure 2 in their relative positions; and Figure 4 shows a part elevation and part sectional view of a gear box showing those parts which effect an interconnection between the selector mechanism and the gear actuating mechanism.

Like reference numerals indicate like parts throughout the figures of the drawings.

Figure 1:
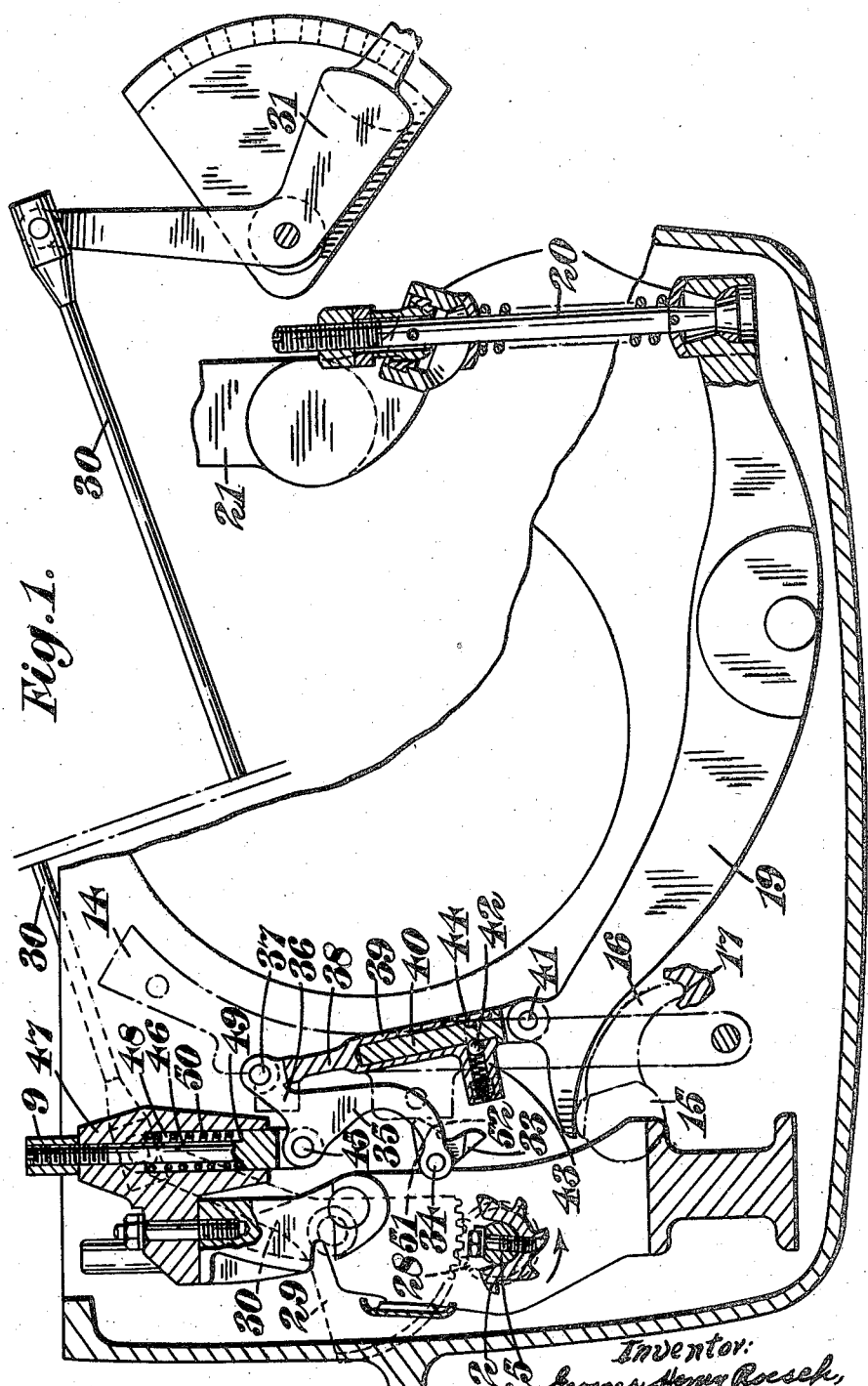
Figure 1 is a cross-section through the gear box showing more particularly the mechanism for effecting automatic preselection of a succession of gear trains in an order from bottom gear to top gear.
Figure 2:
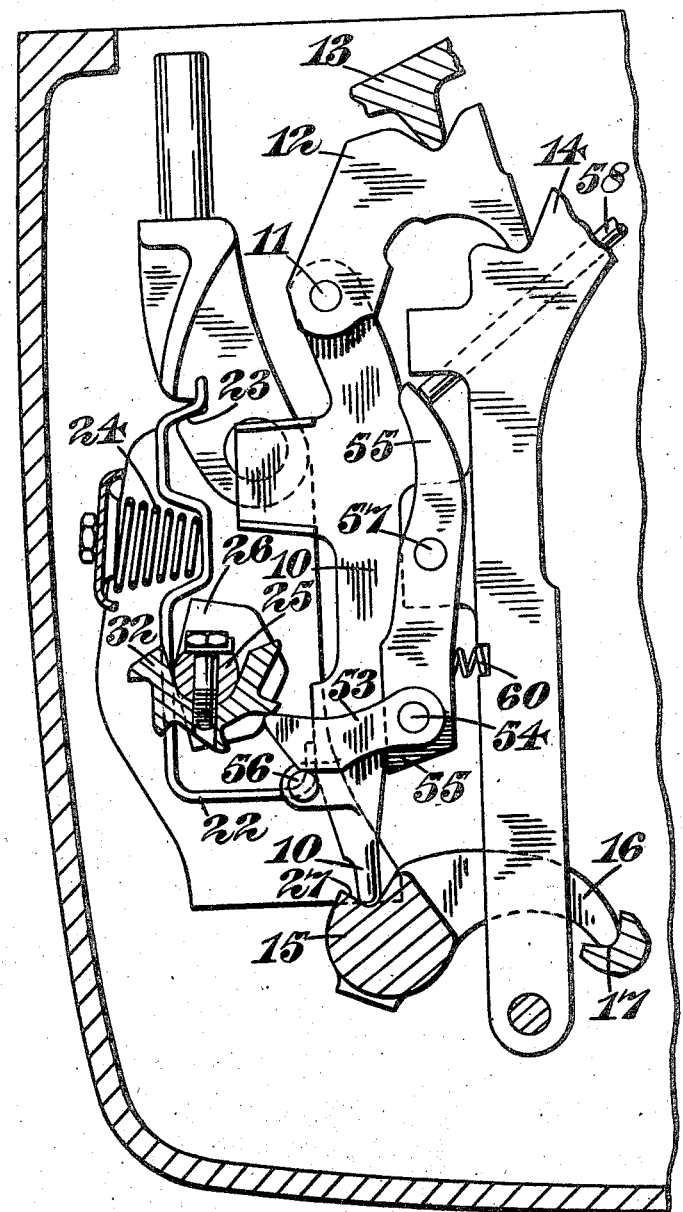
Figure 2 is a cross-section through the gear box showing more particularly the mechanism for automatically preselecting alternately top gear train and the adjacent gear train.

The change speed gear box as shown in Figures 1 to 3 is of a known kind comprising a number of epicyclic gear trains, each of which has gear engaging means comprising a vertically reciprocable swing link 10, as best seen in Figure 2. The link is pivotally attached at 11 to a member 12 which is fulcrumed at 13 and is arranged to operate a brake control member 14 for the planet carrier of the epicyclic gear (not shown). It will be appreciated with this arrangement that vertical reciprocation of each swing link 10 will engage and disengage its respective epicyclic gear. The reciprocation of the swing links is effected by a bus-bar 15 mounted on a lever arm 16 which is fulcrumed to a fixed part of the device at 17.

Referring to Figure 3, it will be seen that a pallet 18 on the upper part of the bus bar 15 is engaged by an actuating member 19, while a lower part of the bus bar is engaged by a strong compression spring (not shown). The actuating member which is in the form of a lever arm pivoted intermediate of its ends is connected through suitable link mechanism 20 to a pedal lever 21 under direct control of the operator. The pedal lever, for the sake of clarity, is shown as pivoted to move in the plane of the paper which is at right angles to its proper plane of movement.

The swing link 10, unless constrained otherwise, tends to swing transversely out of engagement with the bus bar and thus there is a releasable connection between these parts. Each link, however, is arranged to be engaged by a selector link 22, which selector links are pivoted at 23 at their upper ends and are spring urged by compression springs 24 so that they may force the swing links into the path of movement of the bus bar. The selector links, however, may be maintained out of engagement with the swing links by means of a cam shaft 25 having a number of cam tracks 26 thereon, one for engaging each selector. The selector links and cam shaft comprise the selector mechanism. The cam tracks are so arranged that only one selector link may be brought at a time into engagement with a swing link. Once the end of a swing link is engaged by the bus bar it is retained in a trough 27 formed in the upper part thereof until the bus bar is swung downwardly to the bottom extremity of its travel, whereupon the swing link will swing clear of the bus bar since at that juncture it will have been released by its cam owing to the fact that the cam shaft will have been rotated to select another gear.

Thus far, the mechanism conforms to normal practice and it is also usual to provide hand-control means for rotating the cam shaft which is shown diagrammatically in Figure 1 as comprising a worm wheel 28 fixed to the cam shaft 25, which worm wheel is engaged by a worm sector 29 rotatably mounted on a fixed part of the gear box casing. The worm sector is operated by connecting links 30 and a hand setting lever 31.

The movement of the hand lever has the effect of disengaging the selector link from that swing link of the gear in operation and bringing another selector link into engagement with the swing link of the next gear to be engaged. Upon depressing the pedal 21 the bus bar will be lowered, and in lowering will disengage the gear up to then in operation and will ultimately release the swing link of that gear. Another swing link will then be pressed into engagement with the bus bar, which, upon its return movement, will elevate the new swing link and engage another gear.

A change may be effected from top gear to the next gear by automatic means, so that there is preselection backwards and forwards between the two gears until the hand control means are operated.

The means for effecting successive automatic preselection from the bottom gear to the top gear are best shown in Figure 1 and comprise a ratchet wheel 32 secured upon said cam shaft 25, which ratchet wheel is provided with a corresponding number of teeth to the number of changes to be effected. In the present instance, five teeth are provided for reverse, first, second, third and top gear. The ratchet wheel is arranged to be engaged by a pawl 33 which is pivotally mounted at 34 on one arm 35 of a bell crank lever, the other arm 36 of which is hingedly attached at 37 to a rod 38. The said rod is provided with a tubular extension 39 which embraces a pin 40. The pin is secured at 41 to the end of the actuating lever 19. A connection is effected between the sleeve 39 and pin 40 by means of a spring pressed ball 42 which is located partly in a housing 43 formed on said sleeve and which projects into a groove 44 formed in said pin. The bell crank lever 35 is pivotally mounted at 45 at the end of an adjusting rod 46. The adjusting rod is capable of vertical adjustment in the fixed member 47 which carries it. The adjustment is effected by a nut 9 which engages the screwed upper extremity of the member 47. The member is provided with an enlarged bore 48 and the rod is provided with a shoulder 49 within said bore. A compression spring 50 is located between the shoulder on the pin and an upper face of said enlarged bore. By adjustment of the rod 46 the extent of engagement of the pawl 33 with the ratchet wheel 32 may be adjusted. The operation of the mechanism described above is as follows.

The depression of the foot pedal 21 will cause the left hand end of the actuating lever 19 to descend, thereby causing the left hand end of the bell crank lever 35 to swing upwardly and to the left; the pawl 33 is also pivoted upwardly and slides idly over the teeth of the ratchet wheel. The descent of the actuating lever 19 is accompanied by the descent of the bus bar 15 and as already indicated, when the bus bar is at the bottom of its travel the previously engaged swing link will move out of engagement and the previously selected new swing link will be forced into engagement by the selector link 22. Upon release of the foot pedal, the actuating lever 19 will move up again causing the left hand end of the bell crank lever 35 to move downwardly and to the right, the pawl 33 will engage one of the teeth of the ratchet wheel and will be prevented from rotating on its pivot pin 34 by reason of an abutment 51 engaging with a suitable abutment face 52 on the bell crank lever. Thus the ratchet wheel and cam shaft will be rotated so as to free the swinging links just engaged from control of its selector link and at the same time bringing a new selector link into engagement with the swing link next to be engaged. The above operation is carried out in succession on each of the swing links until the top gear has been preselected. The mechanism, best shown in Figure 2, is then brought into operation. As already indicated, this mechanism is solely controlled by the movement of the swing link 10 that engages the top gear. The mechanism comprises a second pawl 53 which is pivotally mounted on a pin 54 carried by an adjusting lever 55. The under edge of the pawl is arranged to be engaged by a pin 56 secured to the swing link 10. Thus, the outer end of the pawl is caused to move up and down with the upward and downward movement of the swing link. The path of movement of the tip of the pawl when in engagement with the pin is arranged to be such that the pawl engages with the teeth of the ratchet wheel. The extent of engagement may be adjusted by means of the adjusting lever 55 which is pivotally mounted at 57 on the member 14 and is engaged at its upper end by an adjusting rod 58 also mounted on the member 14. The adjusting rod is screw threaded at its other extremity and engages a threaded bore on said member.

The lower end of the adjusting lever is spring pressed by a spring 60 towards the ratchet wheel. The position of the parts as shown in Figure 2 are under conditions in which the control pedal 21 has been depressed so as to release the spring link of the gear next the top gear and so as to permit the swing link of the top gear to be pressed into engagement with the bus bar by its selector link 22. The pin 56 on the swing link is thereby brought into engagement with the lower edge of the pawl 53. In this position, the pawl is brought into engagement with the reverse side of that tooth of the ratchet wheel which is engaged by the other pawl 33 when selecting the third gear. This arrangement is merely incidental and for convenience for the location of the pawl. It might very well be that the pawl 53 was arranged to engage the reverse side of that tooth with which the other pawl engages for selecting the second gear. It will be appreciated with this arrangement that in the previous operation of the actuating pedal 21 the ratchet wheel will have been rotated in a clockwise manner as viewed in the drawings to select fourth gear, while the succeeding operation of the actuating pedal now being described will upon the upward movement of the bus bar both engage the fourth gear and also cause the ratchet wheel to be rotated into a position to select third gear and also to bring the last tooth on the ratchet wheel into the path of movement of the other pawl 33, whereby when the actuating pedal is next moved the fourth gear will be preselected and thus changes of gear will automatically be effected in succession backwards and forwards between top and the next gear, unless the hand control means are operated to rotate the cam shaft to position for selecting a lower gear.

In the arrangement shown in Figure 4, automatic adjustment of the selector mechanism is effected only for changing from bottom gear to top gear, the adjustments in the opposite direction being effected by the usual hand setting means. The rotation of the cam shaft may be effected by hand by the usual hand setting means which may comprise a worm wheel 28 fixed to the cam shaft 25 and which is engaged by a worm sector 29. The worm sector is operated by connecting links 30 and a hand setting lever 31. The pedal lever 21 is rotatably mounted at 68 and is provided with an extension 69 having a spherical socket 70. The rocking lever 19 pivotally mounted at 72 near the bottom of the gear box casing 73 has a spherical socket 74 formed at one of the extremities of its arms. Both the spherical sockets 70 and 74 have a central bore through which is threaded a connecting rod 75; said rod is provided at one end with a spherical head 76 and is screw-threaded at the other end to receive a spherical headed nut 77. A compression spring encircles the rod 76 and is disposed between the end of the rocking lever and the end of the extension 69. To the other end of the rocking lever there is pivotally attached at 78 a pawl-carrying rod 79; a pawl 80 is pivotally attached to said rod at the lower end thereof. The upper end of the pawl-carrying rod is supported in a swivel bearing 81 which is mounted in a fork member 82. The fork member is fixed to one end of a shank 83 which extends through a fixed guide-member 84 and is screw-threaded at the other end to receive a nut member 85. A spring 86 is disposed between the fork member and one face of the guide-member, while the face of the nut 85 is provided with a projection 87 which is arranged to engage a recess in the other face of the guide-member 84. It will be appreciated with this arrangement that by rotating the nut 85 the inclination of the pawl-carrying rod 79 in relation to the end of the rocking lever may be adjusted for the purpose outlined earlier in the specification.

The above arrangement is such that successive gear changes from reverse up to top gear can be effected by movement of the foot pedal alone. The drawings show the position of the parts after the foot pedal has been depressed a first time, in order to effect a change of gear from reverse to neutral. The pedal is now completing its return upward journey and has just caused the pawl 80 to rotate the ratchet wheel into a position to select a certain, in this case the first, gear. The rotation of the ratchet wheel also causes the hand lever to move into a position to indicate the selection of the first gear so that so soon as the pedal is a second time depressed and released, the first gear will be engaged while the second gear will be preselected. This second downward movement of the end of the rocking lever 19 will depress the bus bar 15 and permit the swing link appropriate to the first gear to engage the bus bar so that when the pedal lever 21 is released and returns to its initial position, the first part of the movement of the rocking lever permits the bus bar to move upwardly, and forces the swing link to effect engagement of the brake band of the first gear. Continued movement of the rocking lever brings the pawl into engagement with the second tooth on the ratchet wheel and in so doing rotates the cam shaft 25 into such a position that the selector link appropriate to the second gear wheel is actuated. Thus when the pedal lever 21 is a third time operated to lower the bus bar, the first gear swing link will swing out of engagement and the second gear swing link will be forced into engagement with the bus bar by the selector link. On release of the pedal the third time the second gear will be engaged and the rotation of the cam shaft will rotate the worm sector 29 whereby the hand setting lever 31 is brought into a position indicating the preselection of the third gear.

I claim:—

1. A change speed mechanism for a variable speed gear comprising a rocking lever, a reciprocable rod pivotally secured at one end of the lever, a bearing member for guiding said rod, a pawl member pivotally mounted on said rod, a bus bar adapted to be reciprocated by said end of the lever, an operating member connected to the other end of said lever, a plurality of gear engaging and disengaging means, a corresponding number of releasable mechanical connections between said means and said bus bar, an adjustable selector mechanism adapted to close any one of said connections and to release the other connections and comprising a rotatable shaft having fixed thereto a ratchet wheel, which ratchet member and ratchet wheel are so disposed that operating engagement is effected during the latter part of the movement of the rocking lever and the movement of which bus bar in one direction is caused to operate the gear disengaging means while in the other direction it is arranged to operate the gear engaging means, the respective connection of which has been closed by said selector mechanism.

2. A change speed mechanism for a variable speed gear comprising a rocking lever, a reciprocable rod pivotally secured at one end of the lever, a bearing member for guiding said rod, a pawl member pivotally mounted on said rod, a bus bar adapted to be reciprocated by said end of the lever, an operating member connected to the other end of said lever, a plurality of gear engaging and disengaging means, a corresponding number of releasable mechanical connections between said means and said bus bar, an adjustable selector mechanism adapted to close any one of said connections and to release the other connections and comprising a rotatable shaft having fixed thereto a ratchet wheel, which ratchet member and ratchet wheel are so disposed that operating engagement is effected during the latter part of the movement of the rocking lever and the movement of which bus bar in one direction is caused to operate the gear disengaging means while in the other direction it is arranged to operate the gear engaging means, the respective connection of which has been closed by said selector mechanism and means for effecting adjusting movement of said bearing member towards and away from said ratchet wheel.

3. A change speed mechanism for a variable speed gear comprising a rocking lever, a plurality of gear engaging and disengaging means, a corresponding number of releasable mechanical connections between said means and one end of said lever, adjustable selector mechanism adapted to close any one of said connections and to release the other connections, ratchet mechanism for connecting the end of said lever with the selector mechanism so that towards the latter part of the movement of said rocking lever the adjustment of the selector mechanism is altered, a pedal lever, and a link mechanism for connecting said pedal lever to the other end of said rocking lever.

4. A change speed mechanism for a variable speed gear comprising a rocking lever, a plurality of gear engaging and disengaging means, a corresponding number of releasable mechanical connections between said means and one end of said lever, adjustable selector mechanism adapted to close any one of said connections and to release the other connections, ratchet mechanism for connecting the end of said lever with the selector mechanism so that towards the latter part of the movement of said rocking lever the adjustment of the selector mechanism is altered, a pedal lever and a resilient link mechanism for connecting said pedal lever to the other end of said rocking lever.

5. A change speed mechanism for a variable speed gear comprising a number of gear trains having different ratios, a corresponding number of gear engaging and disengaging means, an equal number of releasable mechanical connections between said means and the actuating member, an adjustable selector mechanism adapted to close any one of said connections and to release the other connections, and means interconnecting the actuating member with the selector mechanism so that a succession of movements of the actuating member effects a succession of adjustments of the selector mechanism, whereby the gear trains are brought into operation in a sequence of varying ratios from bottom gear to top gear, and means for interconnecting the gear engaging and disengaging means to the selector mechanism whereby the gear trains are brought into operation in succession in a sequence of varying ratios from the top gear to the next lower gear, and an additional operating member under direct control of the driver and connected to said selector mechanism so that it may be adjusted independently of the actuating member.

6. A change speed mechanism for a variable speed gear comprising a movable actuating member, a plurality of gear engaging and disengaging means, a corresponding member of releasable mechanical connections between said means and the actuating member, an adjustable selector mechanism adapted to close any one of said connections and to release the other connections and comprising a rotatable shaft, a one-way drive device connecting said actuating member to said rotatable shaft so as to drive it in one direction, means for rendering said one-way drive device inoperative when the last of the succession of gear trains has been brought into operation, another one-way drive device connected with the gear engaging and disengaging means of said last train of gears so as to rotate said shaft in the opposite direction when said last train is brought into operation, and an additional operating member under direct control of the driver and connected to said selector mechanism so that it may be adjusted independently of the actuating member.

7. A change speed mechanism for a variable speed gear comprising a number of gear trains of different gear ratios, a reciprocable actuating member, a plurality of gear engaging and disengaging means, a corresponding number of releasable mechanical connections between said means and the actuating member, an adjustable selector mechanism adapted to close any one of said connections and to release the other connections and comprising a rotatable shaft, the gear engaging and disengaging means of the gear train for top gear embodying a reciprocable member, and ratchet mechanism connected between said selector mechanism and the reciprocable actuating member and between said selector mechanism and said reciprocable member, so that movement of the actuating member rotates the shaft in one direction and movement of the reciprocable member moves the shaft in the other direction, and an additional operating member under direct control of the driver and connected to said selector mechanism so that it may be adjusted independently of the actuating member.

8. A change speed mechanism for a variable speed gear comprising a number of gear trains of different gear ratio, a reciprocable actuating member, a plurality of gear engaging and disengaging means, a corresponding number of releasable mechanical connections between said means and the actuating member, an adjustable selector mechanism adapted to close any one of said connections and to release the other connections, and comprising a rotatable shaft having a mutilated ratchet wheel mounted thereon, which gear engaging and disengaging means of the gear train for top gear embodies a reciprocable member, a pawl mounted on said reciprocable member, another pawl mounted on said actuating member, which pawls are arranged to engage said ratchet wheel so that movement of the actuating member rotates the shaft in one direction and said gear engaging means rotate the shaft in the other direction, and an additional operating member under direct control of the driver and connected to said selector mechanism so that it may be adjusted independently of the actuating member.

9. A change-speed mechanism for a variable speed gear comprising driving and driven shafts, a plurality of gear trains, means for engaging or disengaging each of said gear trains with or from said shafts, a manually operable actuating member, a selector shaft movable between limits which is arranged, when moved in one direction between said limits, to operate said gear-engaging and disengaging means in succession, whereby changes of gear between bottom and top gears are effected, a driving gear between said actuating member and said operating shaft, means operated by one of said gear-engaging and disengaging means for reversing said driving gear after top gear has been engaged, whereby a succession of changes is effected backwards and forwards between top gear and the next lower gear and a preselector control mechanism which is adapted at any time to move said operating shaft into a position to engage a desired gear train when next the actuating member is moved.

GEORGES HENRY ROESCH.